UNITED STATES PATENT OFFICE.

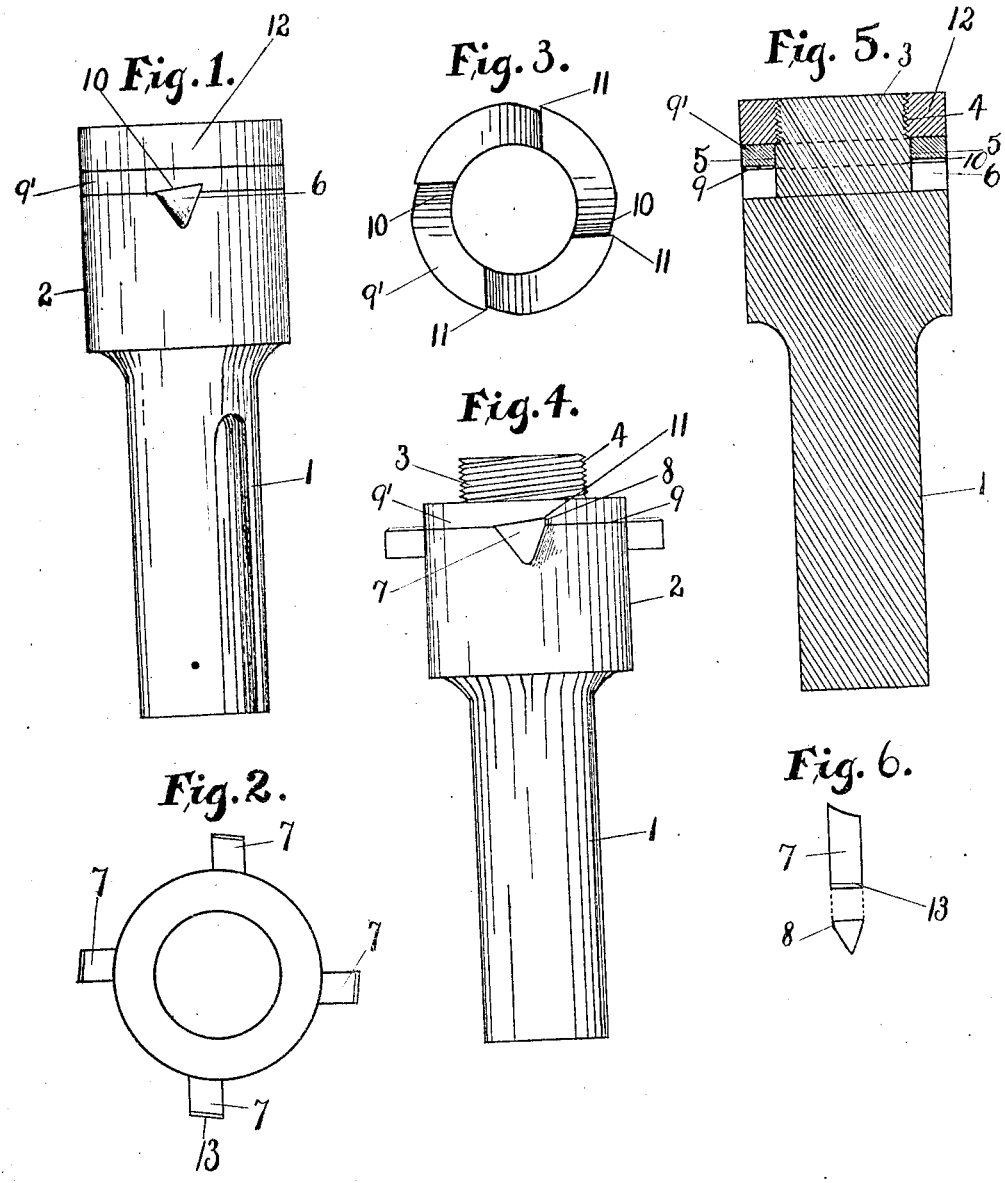

ROY N. MELVIN, OF MEADVILLE, PENNSYLVANIA, ASSIGNOR OF ONE-HALF TO WINTERS D HAMAKER, OF MEADVILLE, PENNSYLVANIA.

REAMER AND BORING-HEAD.

No. 882,529.

Specification of Letters Patent.

Patented March 17, 1908.

Application filed December 13, 1906. Serial No. 347,657.

*To all whom it may concern:*

Be it known that I, ROY N. MELVIN, a citizen of the United States, residing at Meadville, in the county of Crawford and State of Pennsylvania, have invented new and useful Improvements in Reamers and Boring-Heads, of which the following is a specification.

My invention relates to reamers & boring heads and its object is to provide a device of this class particularly adapted for giving a shearing cut, for enabling the cutters to be readily adjusted, and removed and replaced when worn, and designed to provide means whereby the cutters may be securely, although removably locked in place, on the tool, to so mount the cutters that they will cut at the most effective angle, and will not require clearance grinding on their cutting edges and to provide a cutter having a plurality of interchangeable cutting edges. To these ends my invention is embodied, in preferable form, in the device hereinafter described and illustrated in the accompanying drawings.

In these drawings, Figure 1 is a side view in elevation showing one of the cutters removed; Fig. 2 is a top plan view; Fig. 3, a bottom plan of the clamping ring for the cutters; Fig. 4, a front elevation showing one of the cutters in place and the clamping ring in position on the tool stem, but with the lock nut removed; Fig. 5, a central vertical section, and Fig. 6, a detail plan and front view of one of the cutters.

Referring to the drawings, 1 is the shank of the tool adapted to be supported in a suitable operating device and 2 is the head in which the reaming cutters are carried. A stem 3 extends beyond the head and is provided with a screw-threaded portion 4 and a plain peripheral portion 5. In the upper edge of the head 2 are formed V-shaped recesses or slots 6 adapted to receive the cutters 7. Four of these cutters are preferably provided although a greater or less number may be employed, if desired. Each cutter 7 is triangular in form and so made that any one of its longitudinal edges may be ground down to a cutting edge and a cutter so placed in the slot 6 as to bring any one of these edges into cutting position.

In the device shown, 8 designates the cutting edge of the cutters when the tool is used as a reamer, while the forward longitudinal edge constitutes the cutting edge when the tool is used as a boring tool. The slot 6 is so cut as to present one of its walls at a greater angle to the upper surface 9 of the head, than the other wall, whereby when the equilaterally triangular cutter is placed in the slot, the upper surface of the cutter will be tilted at an angle so as to raise the front or cutting edge higher than the rear edge of the cutter, so as to obtain a shearing cut on the forward longitudinal edge. The cutters are placed loosely in the slots and are then engaged by a clamping ring 9 surrounding the plain portion 5 of the stem 3. This ring is provided with slanting cut-away or recessed portions 10 each terminating in a shoulder 11, which portions slant correspondingly to the angle of the outer plane faces of the tilted cutters and bear upon said faces so as to clamp the cutters in place, while the shoulders 11 abut against the projected edges of the cutters and serve to hold the ring in proper position with respect to the cutters. With this form of clamping ring, it is rendered possible to firmly clamp all the cutters, even where the edges of some of the cutters may be ground down more than on others, since the clamping pressure is obtained against the plane surfaces and not merely against the edges of the cutters.

To securely hold the clamping ring in position and clamp it against the cutters, a lock-nut 12 engaging the threaded portion 4 of the stem is provided and is adapted to be screwed down upon the clamping ring when the reamer is to be used.

To adjust the cutters in or out to fit holes of different sizes or in the event of the enlargement of the cutter socket through vibration or otherwise, it is merely necessary to loosen the lock-nut, move the cutter to proper position and again lock the clamping ring with the nut. The shear cut obtained by the triangular cutters mounted as shown, reduces the friction so that a larger hole can be bored with the same power as that generally required in reamers and boring tools of the ordinary construction. By the use of the recessed clamping collar which is so formed that it may be clamped against cutters having different clearances on the cutting edge, it is rendered unnecessary to grind the cutting edge to obtain the clearance. The clamping ring also coöperates with the tilted socket to enable the cutter to be placed so as to present its cutting edge at an acute angle so as to obtain better results in cutting.

Upon the wearing down of one of the cutting edges, the cutter may be changed to present either of the other longitudinal edges as a cutting edge by merely grinding either of said edges and by properly grinding off the outer end of the cutter to form the clearance bevel 13. When the cutters become too worn to be further used or are broken, they may be readily replaced by new cutters, by unlocking the nut and releasing the clamping ring.

The tool can be made in all sizes to meet the requirements of manufacturers using boring mills, drill presses and turret machinery and made with either tapering shanks or otherwise to fit the adjustment of any machine.

It is clear that various changes in the particular construction of the above features may be made without departing from the principle of my invention.

Having thus described my invention, what I claim is:

1. In a cutting tool, in combination with a removable cutter triangular in cross-section, a supporting head having a socket to receive the cutter substantially bodily, said socket having its walls at different angles to the plane outer surface of the head, said cutter having one of its plane faces projected angularly above said surface, a clamping ring, said ring having a slanting cut-away portion on its inner face of substantially the same length as the projected plane face of the cutter and adapted to bear on said face, and means to press said ring and cutters together, substantially as described.

2. In a cutting tool, in combination with a removable cutter, a supporting head having a socket to receive the cutter, said cutter having a plane face projected angularly beyond the socket, a clamping ring having a slanting cut-away portion substantially of the same length as the width of the cutter face and directly opposite the socket opening, and means to lock said clamping ring and cutter together, substantially as described.

3. In a cutting tool, in combination with a removable, triangular cutter, a supporting head having a V-shaped socket with its walls diverging outwardly to the plane outer surface of the head, and at different angles thereto, said cutter being supported in said socket and having one of its plane faces projected beyond the same, a clamping ring having a slanting cut-away portion terminating in a shoulder, said slanting portion bearing substantially throughout its length on the said projected plane face of the cutter, and a lock-nut to clamp said ring and cutters together, substantially as described.

In testimony whereof I affix my signature, in presence of two subscribing witnesses.

ROY N. MELVIN.

Witnesses:
M. WEBSTER,
OTTO A. STOLZ.